US007830747B2

(12) United States Patent
Söllner (10) Patent No.: US 7,830,747 B2
(45) Date of Patent: Nov. 9, 2010

(54) METHOD FOR MULTI-AZIMUTH PRESTACK TIME MIGRATION FOR GENERAL HETEROGENEOUS, ANISOTROPIC MEDIA

(75) Inventor: Walter Söllner, Oslo (NO)

(73) Assignee: PGS Geophysical AS, Lysaker (NO)

( * ) Notice: Subject to any disclaimer, the term of this patent is extended or adjusted under 35 U.S.C. 154(b) by 613 days.

(21) Appl. No.: 11/591,380

(22) Filed: Nov. 1, 2006

(65) Prior Publication Data
US 2008/0137478 A1 Jun. 12, 2008

(51) Int. Cl.
*G01V 1/00* (2006.01)
(52) U.S. Cl. .......................... 367/51; 702/14
(58) Field of Classification Search ............ 367/51; 702/17, 16, 14
See application file for complete search history.

(56) References Cited

U.S. PATENT DOCUMENTS

| 5,285,422 | A | 2/1994 | Gonzalez et al. | |
|---|---|---|---|---|
| 5,596,547 | A | 1/1997 | Bancroft et al. | |
| 6,446,007 | B1 | 9/2002 | Finn et al. | |
| 6,826,484 | B2 | 11/2004 | Martinez et al. | |
| 6,889,142 | B2 * | 5/2005 | Schonewille | 702/17 |
| 2001/0051854 | A1 | 12/2001 | Lailly et al. | |
| 2004/0243312 | A1 * | 12/2004 | Schonewille | 702/14 |
| 2007/0260404 | A1 * | 11/2007 | Dong et al. | 702/16 |

OTHER PUBLICATIONS

B. Ursin, "Quadratic wavefront and traveltime approximation in inhomogeneous layered media with curved interfaces", Geophysics, vol. 47, No. 7, Jul. 1982, p. 1012-1021.

R. Bortfeld, "Geometrical ray theory: Rays and traveltimes in seismic systems (second order approximation of traveltimes)", Geophysics, vol. 54, No. 3, Mar. 1989, p. 342-349.

J. Schleicher et al., "Parabolic and hyperbolic paraxial two-point traveltimes in 3D media", Geophysical Prospecting, vol. 41, 1993, p. 495-513.

P. Hubral et al., "Three-dimensional primary zero-offset reflections", Geophysics, vol. 58, No. 5, May 1993, p. 692-702.

V. Grechka et al., "3-D description of normal moveout in anisotropic inhomogeneous media", Geophysics, vol. 63, No. 3, May-Jun. 1998, p. 1079-1092.

V. Grechka et al., "Generalized Dix equation and analytic treatment of normal-moveout velocity for anisotropic media", Geophysical Prospecting, vol. 47, 1999, p. 117-148.

W. Sollner, "Time migration decomposition: a tool for velocity determination", 66th Ann. Intl. Mtg., SEG, Exp. Abstracts, 1996, p. 1172-1175.

W. Sollner et al., "Diffraction response simulation: a 3D velocity inversion tool", 72nd Ann. Intl. Mtg., SEG, 2002, p. 2293-2296.

(Continued)

*Primary Examiner*—Mark Hellner
(74) *Attorney, Agent, or Firm*—E. Eugene Thigpen; Charles R. Schweppe (57) ABSTRACT

Three data subsets are obtained in three selected azimuthal directions from seismic data in heterogeneous, anisotropic media. Azimuthal velocities are determined for each of the data subsets. A linear system of equations in the three selected azimuthal directions and the three determined azimuthal velocities is solved for three independent parameters. An azimuthal time migration velocity function is constructed from the three solved independent parameters. A time migration traveltime function is constructed from the constructed azimuthal time migration velocity function.

21 Claims, 3 Drawing Sheets

OTHER PUBLICATIONS

W. Sollner et al., "Fast time-to-depth mapping by first-order ray transformation in a 3-D visualization system", 74th Ann. Intl. Mtg., SEG, 2004, p. 1081-1084.

W. Sollner et al., Kinematic time migration and demigration in a 3D visualization system, J. of Seismic Exploration, vol. 14, 2005, p. 255-270.

H.A. Buchdahl, "An introduction to Hamiltonian Optics", Cambridge University Press, 1970, pp. 1-13, 248-257.

P. Hubral, "Time migration: Some ray theoretical aspects", Geophysical Prospecting, 1977, pp. 738-745, vol. 25.

P. Hubral, T. Krey, "Intregal velocities from seismic refection measurements", Society of Exploration Geophysicist, 1980, Chapter 7, pp. 81-012.

P. Hubral, J. Schleicher, M. Tygel, "Three-dimensional paraxial ray properties—Part I. Basics relations", Journal of Seismic Exploration, 1992, pp. 265-279, vol. 1.

Jake Collins, British Search Report, Feb. 6, 2008.

* cited by examiner

METHOD FOR MULTI-AZIMUTH PRESTACK TIME MIGRATION FOR GENERAL HETEROGENEOUS, ANISOTROPIC MEDIA

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting and particularly to the field of marine seismic surveys. More particularly, the invention relates to imaging of marine seismic data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downwardly into the subsurface of the earth. In a marine seismic survey, the seismic signal may also travel downwardly through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically wave velocity and rock density, which lead to differences in elastic impedance at the interfaces. The reflections are detected by seismic sensors at or near the surface of the earth, in an overlying body of water, or at known depths in boreholes. The resulting seismic data is recorded and processed to yield information relating to the geologic structure and properties of the subterranean formations and their potential hydrocarbon content.

Appropriate energy sources may include explosives or vibrators on land and air guns or marine vibrators in water. Appropriate types of seismic sensors may include particle velocity sensors in land surveys and water pressure sensors in marine surveys. Particle displacement, particle acceleration sensors, or pressure gradient sensors may be used instead of particle velocity sensors. Particle velocity sensors are commonly know in the art as geophones and water pressure sensors are commonly know in the art as hydrophones. Both seismic sources and seismic sensors may be deployed by themselves or, more commonly, in arrays.

In a typical marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers have been proposed that contain water particle motion sensors such as geophones, in addition to hydrophones. The pressure sensors and particle velocity sensors may be deployed in close proximity, collocated in pairs or pairs of arrays along a seismic cable.

The sources and streamers are submerged in the water, with the seismic sources typically at a depth of 5-15 meters below the water surface and the seismic streamers typically at a depth of 5-40 meters. Seismic data gathering operations are becoming progressively more complex, as more sources and streamers are being employed. These source and streamer systems are typically positioned astern of and to the side of the line of travel of the seismic vessel. Position control devices such as depth controllers, paravanes, and tail buoys are used to regulate and monitor the movement of the seismic streamers.

Alternatively, the seismic cables are maintained at a substantially stationary position in a body of water, either floating at a selected depth or lying on the bottom of the body of water. In this alternative case, the source may be towed behind a vessel to generate acoustic energy at varying locations, or the source may also be maintained in a stationary position.

Although modern 3D marine seismic acquisition systems with up to sixteen streamers may acquire a large distribution of offsets and azimuth for every midpoint position, available parameter determination techniques (e.g. semblance stacks in different configurations) do not allow for effective azimuth-dependent moveout analysis. Those parameters (i.e. azimuthal velocities), extracted from a general reflection time function, can be of great significance towards a better time imaging; a time imaging beyond the conventional model limitation (i.e., horizontal layering of homogeneous layers along with a vertical velocity gradient). However, this better imaging requires wide or multi-azimuth seismic data acquisition and truly three-dimensional velocity analysis, that is, azimuthal velocity analysis.

The deficiencies in current velocity analysis are due to the small number of traces with higher azimuth and reduced offset in the cross line direction. Thus, there exists a need to develop effective migration techniques that work effectively in three-dimensional media that is not just simply-layered and homogeneous. This need has led to work in determining effective approximations for traveltime functions for transmitted and reflected rays and their corresponding normal moveout and migration velocities.

Ursin, B., 1982, "Quadratic wavefront and travel time approximations in inhomogeneous layered media with curved interfaces", *Geophysics,* 47, 1012-1021 describes a quadratic approximation for the square of the traveltime from source to receiver in three-dimensional horizontally-layered media. Ursin 1982 determines that its hyperbolic traveltime approximations are superior to its parabolic approximations.

Bortfeld, R., 1989, "Geometrical ray theory: Rays and traveltimes in seismic systems (second order of approximation of the traveltimes)", *Geophysics,* 54, 342-349 describes second-order parabolic approximations for the traveltimes of transmitted and reflected rays in layered media with constant velocities.

Schleicher, J., Tygel, M., and Hubral, P., 1993, "Parabolic and hyperbolic paraxial twopoint traveltimes in 3D media", *Geophysical Prospecting,* 41, 495-513 describes second-order parabolic or hyperbolic approximations for the traveltimes of rays in the vicinity of a known central ray in laterally inhomogeneous isotropic layered media. Hubral, P., Schleicher, J., and Tygel, M., 1993, "Three-dimensional primary zero-offset reflections" *Geophysics*, 58, 692-702, further describe how integration of one-way dynamic ray tracing, instead of two-way integration, suffices to determine factors such as the geometrical-spreading factor that effect zero-offset reflection amplitudes, the reflector Fresnel zone, and a normal moveout velocity.

Grechka, V. and Tsvankin, I, 1998, "3-D description of normal moveout in anisotropic inhomogeneous media", *Geophysics*, 63, 1079-1092, and Grechka, V., Tsvankin, I. and Cohen, J. K., 1999, "Generalized Dix equation and analytic treatment of normal-moveout velocity for anisotropic media", *Geophysical Prospecting*, 47, 117-148 describe a solution for the normal moveout (NMO) velocity in vertically inhomogeneous, anisotropic media through solving the Christoffel equation for slowness vector parameters or through a generalized Dix equation approach to rms averaging of layer NMO velocities.

Söllner, W., 1996, "Time migration decomposition: A tool for velocity determination" $66^{th}$ Annual International Meeting., SEG, Expanded Abstracts, 1172-1175 describes a method for determining interval velocities by time migration-decomposition of zero offset stacked traces. Söllner 1996 uses the methodology described in Bortfeld 1989, above.

Söllner, W. and Yang, W-Y., 2002, "Diffraction response simulation: A 3D velocity inversion tool", $72^{nd}$ Annual International Meeting, SEG, Expanded Abstracts, 2293-2296 describes a method for determining zero offset diffraction point responses in three-dimensional laterally heterogeneous media. The method needs only normal moveout velocities and zero offset reflection time slopes from the stacked data cube.

Söllner, W., Anderson, E., and Jostein Lima, 2004, "Fast time-to-depth mapping by first-order ray transformation in a 3-D visualization system", $74^{th}$ Annual International Meeting., SEG, Expanded Abstracts, describes a method for applying a Runge-Kutta solver to a first-order approximation of ray transformation matrices as described in Bortfeld 1989, above.

Söllner, W. and Anderson, E., 2005, "Kinematic time migration and demigration in a 3D visualization system", *Journal of Seismic Exploration*, 14, 255-270 describes three-dimensional kinematic time migration based on azimuthal NMO stacking velocities and zero offset time slopes. Söllner et al. 2005 further describes kinematic time demigration based on azimuthal time migration velocities and time migration slopes. Both processes are derived for three-dimensional media with mildly-dipping layers with weakly-varying velocities and smoothly curved interfaces.

Martinez, R. and Sun, C., 2004, "3D Prestack Time Migration Method", U.S. Pat. No. 6,826,484 B2, describes a Kirchoff-type time migration using a weighted diffraction stack in horizontally-layered, transversely isotropic media with a vertical symmetry axis (VTI).

As the azimuthal dependency of time velocities can either be caused by anisotropy, by inhomogeneity, or both together, then azimuthal velocity analysis should also be based on a general heterogeneous, anisotropic model. Thus, a need exists for azimuthal velocity analysis that allows time migration that is effective in general heterogeneous, anisotropic media.

BRIEF SUMMARY OF THE INVENTION

The invention is a method of multi-azimuth velocity analysis and prestack time migration for seismic data in anisotropic, heterogeneous media. Three data subsets are required in three distinct azimuthal directions from the seismic data set. Azimuthal velocities are determined for each of the data subsets. A linear system of equations in the three selected azimuthal directions and the three determined azimuthal velocity fields are solved for three independent parameters. Azimuthal time migration velocity functions (ellipses) are constructed from the three independent parameters, which allow building the 3D prestack time migration operator, the time migration traveltime function.

BRIEF DESCRIPTION OF THE DRAWINGS

The invention and its advantages may be more easily understood by reference to the following detailed description and the attached drawings, in which.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

Conventional prestack time migration (PSTM) velocity analysis from one predominant azimuth direction allows determining diffraction time functions solely in one azimuth direction. As a consequence, it allows building 3D migration operators only for horizontally layered media, which have an axis of symmetry along the z-axis. Extending the migration method to handle general heterogeneity and anisotropy requires asymmetric diffraction time functions. The diffraction time function, in the present invention, is derived from the most general form of Hamilton's principal equation and is approximated by a Taylor expansion in the vicinity of the image ray. The Taylor coefficients are derived from multi-azimuth imaging parameters. The second-order coefficients, for example, are obtained from azimuth-dependent time migration velocity analyses in at least three predominant azimuth directions. The multi-azimuth prestack time migration operator obtained is valid for general three-dimensional anisotropic, inhomogeneous media.

Figure 1A:
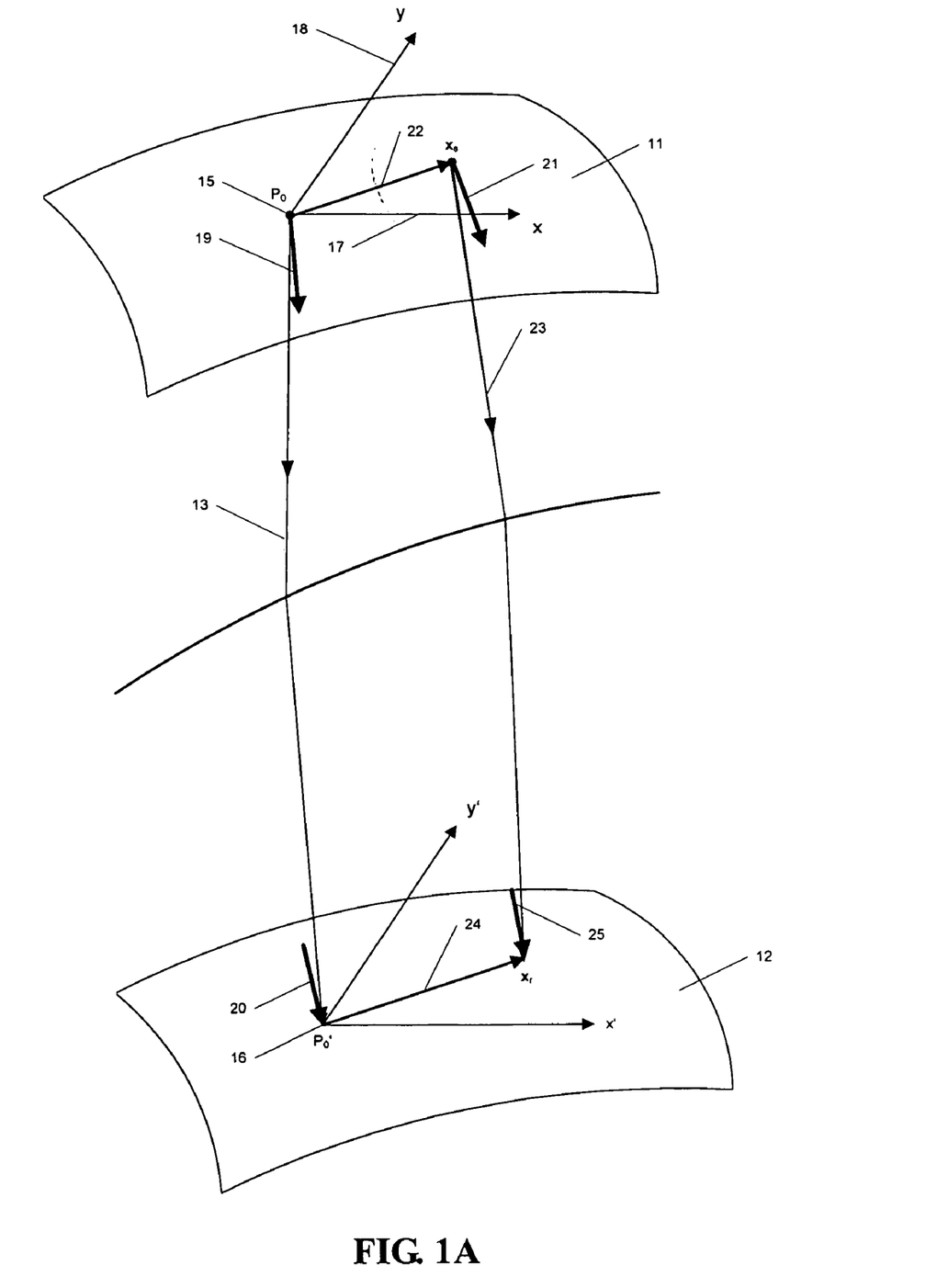
FIGS. 1A and 1B are schematic representations of the seismic system of surfaces, rays, and vectors involved in the method of the invention for azimuthal velocity analysis and prestack time migration.
Figure 1B:
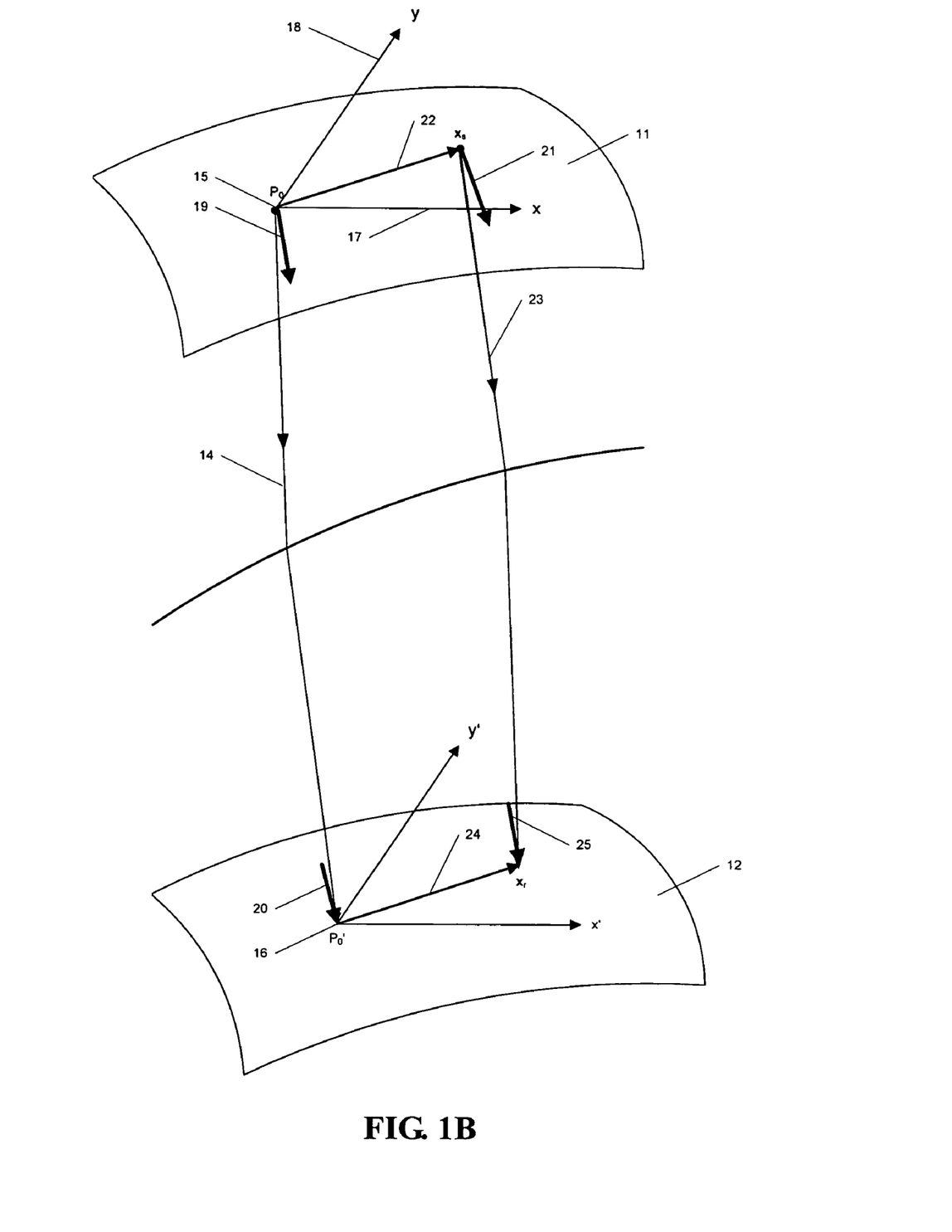

An earth model is represented in FIGS. 1A and 1B as a seismic system which comprises homogenous, anisotropic layers of arbitrary velocities and densities. The layers are separated by arbitrarily curved smooth interfaces. Here, these interfaces will be smooth in the sense of being represented locally by second-order functions. The uppermost interface 11, called the anterior surface, is the earth surface, where the sources and receivers are located. In a marine environment, in particular, this surface is substantially flat. The lowermost surface 12, called the posterior surface, is the reflecting interface. One selected ray, called the central ray, travels from the uppermost, anterior surface 11 to the lowermost, posterior surface 12. The central ray may, for example, be an image ray 13, as shown in FIG. 1A, or a normal ray 14, as shown in FIG. 1B. The central ray intersects the anterior surface 11 at the origin 15 of a Cartesian (x, y, z) coordinate system and intersects the posterior surface 12 at the origin 16 of another Cartesian (x', y', z') coordinate system. All other rays will be referenced to the central ray.

Let $P_0$ denote the point of intersection 15 of the central ray with the anterior surface 11. The tangent plane to the anterior surface 11 at $P_0$ is taken as the xy plane of the (x, y, z)

Cartesian coordinate system with origin 15 at $P_0$. The x and y axes 17, 18 may have any directions, perpendicular to one another, in the tangent plane at $P_0$. The central ray may be described by four three-component vectors: an initial position vector $\vec{x}_0$, an initial central ray slowness vector $\vec{p}_0$ 19, a final position vector $\vec{x}_0'$, and a final central ray slowness vector $\vec{p}_0'$ 20. The parameters associated with the central ray will have the subscript 0. The initial ray slowness vector $\vec{p}_0$ 19 is defined by Hamilton's characteristic function for anisotropic heterogeneous media like any arbitrary ray slowness vector $\vec{p}$ 21 of the seismic system, by:

$$\begin{pmatrix} \partial t/\partial x \\ \partial t/\partial y \\ \partial t/\partial z \end{pmatrix} = \frac{1}{|\vec{V}|}\vec{\dot{x}} + (1 - \vec{\dot{x}}\vec{\dot{x}}^T)\frac{\partial}{\partial \vec{\dot{x}}}\left(\frac{1}{|\vec{V}|}\right) \equiv \vec{p} \qquad (1)$$

with the anisotropy vector $\vec{a}(\vec{x},\vec{\dot{x}})$ given by, $$(1 - \vec{\dot{x}}\vec{\dot{x}}^T)\frac{\partial}{\partial \vec{\dot{x}}}\left(\frac{1}{|\vec{V}|}\right) \equiv \vec{a}(\vec{x},\vec{\dot{x}}), \qquad (2)$$

where t is the one-way traveltime, $\vec{V}$ is the ray velocity vector (group velocity), $\vec{x}$ is the ray position vector 22, and $\vec{\dot{x}}$ is the ray direction vector 23.

The three partial differentials of the action t(x,y,z,x',y',z'), considered as functions of the coordinates x,y,z of the point to which t is measured, are for any given point $\vec{x}$ (x,y,z) 22 of the medium constructed by fixed relations with the cosines of the angles which the unit direction vector, $\vec{\dot{x}}$ (x,y,z) 23, tangent to the curved ray makes with the axes of coordinates. If the ray velocity $\vec{V}$ is not direction dependent (i.e. group velocity is equal to phase velocity), the anisotropy vector $\vec{a} = \vec{0}$, and the partial derivatives of t(x,y,z,x',y',z') are the components of the isotropic slowness vector. In anisotropic media the ray velocity is direction dependent. Thus, the anisotropy vector, as defined in Equation (2), is $\vec{a} \neq \vec{0}$ and is always orthogonal to the direction of the ray propagation (which is verified by building the dot product $$\vec{a}\cdot\vec{\dot{x}}$$

using Equation (2)). The two-component representation of the slowness vector (as later used), denoted by $p(p,q)^T$ is given by the projection onto the xy plane, if $\vec{x} = (x,y,z=0)^T$ is a point in the plane surface of measurement, as:

$$\begin{pmatrix} \partial t/\partial x \\ \partial t/\partial y \end{pmatrix} = \frac{1}{|\vec{V}|}\vec{\dot{x}} + (1 - \vec{\dot{x}}\vec{\dot{x}}^T)\frac{\partial}{\partial \vec{\dot{x}}}\left(\frac{1}{|\vec{V}|}\right) \equiv p. \qquad (3)$$

For a given length of the ray velocity vector $|\vec{V}|$, the three component slowness vector $\vec{p}$ can be reconstructed from the two component slowness vector p based on Equations (1), (2), and (3). Final slowness vectors are defined analogously on the posterior surface.

Consider an arbitrary ray through the seismic system, starting in an arbitrary direction at the arbitrary point P on the anterior surface. The position and direction of the arbitrary ray may be represented by an initial position vector $\vec{x}$ 22 and an initial ray slowness vector $\vec{p}$ 21. Analogous to the initial quantities in or at the anterior surface there are final quantities in or at the posterior surface. They are denoted by the corresponding primed quantities measured in the primed (x', y', z') Cartesian coordinate system with the origin 16 at the point $P'_0$ on the central ray. All initial quantities are denoted by unprimed symbols; all final quantities are denoted by the corresponding primed quantities.

Thus, for any pair of initial vectors $\vec{x}$ 22 and $\vec{p}$ 21, there is a pair of final vectors $\vec{x}'$ 24 and $\vec{p}'$ 25. The two-dimensional vectors x, p, and x', p' are obtained by projection of the three-dimensional position and slowness vectors into the initial tangent plane and the final tangent plane, respectively. Each of the four components of x' and p' is a function of the four components of the initial vectors: x'=x'(x, p) and p'=p'(x, p). The four components of x' and p' are, in general, complicated functions of x and p. Therefore, first-order approximations are introduced. These first-order approximations of x' and p' correspond to second-order approximations of the traveltime function t. These approximations are, in general, valid for "small" values of the magnitudes of the vectors x, p-$p_0$, x', and p'-$p_0'$, i.e., in the vicinity of the central ray.

The central ray and all paraxial rays sufficiently close to the central ray can be described by means of a 4×4 ray propagator matrix T given by:

$$T = \begin{bmatrix} A & B \\ C & D \end{bmatrix}, \qquad (4)$$

composed of four 2×2 matrices A, B, C, and D which characterize the transmission of the central ray from the anterior surface to the posterior surface by:

$$\begin{bmatrix} x' - x_0' \\ p' - p_0' \end{bmatrix} = \begin{bmatrix} A & B \\ C & D \end{bmatrix}\begin{bmatrix} x - x_0 \\ p - p_0 \end{bmatrix}. \qquad (5)$$

The four matrices are Jacobian matrices that represent the Taylor series expansion of the transformation developed around x=$x_0$ and p=$p_0$, i.e., at the central ray.

By construction, $x_0$=0 and $x'_0$=0, since they are located at the origins of their respective coordinate systems. The four 2×2 matrices A, B, C, and D are replaced by four constant 2×2

Jacobian matrices $A_0$, $B_0$, $C_0$, and $D_0$, respectively, which represent the zero-order terms of the Taylor series developed around $x_0=0$ and $p=p_0$. For example, $A_0$ is the Jacobian matrix $$A_0 = \frac{\partial(x', y')}{\partial(x, y)}, \tag{6}$$

taken at $x=0$ and $p=p_0$. This zeroth-order approximation of the propagator matrices corresponds to the first-order approximations of x' and p' and the second-order approximations of the traveltime function, discussed above.

Then, Equation (5) simplifies to:

$$\begin{bmatrix} x' \\ p' - p'_0 \end{bmatrix} = \begin{bmatrix} A_0 & B_0 \\ C_0 & D_0 \end{bmatrix} \begin{bmatrix} x \\ p - p_0 \end{bmatrix} \begin{bmatrix} x' \\ p' - p'_0 \end{bmatrix} \tag{7}$$

$$= \begin{bmatrix} A_0 & B_0 \\ C_0 & D_0 \end{bmatrix} \begin{bmatrix} x \\ p - p_0 \end{bmatrix}.$$

These matrices correspond to the one-way dynamic ray tracing matrices along the normal ray. Equation (7) says that first-order approximations to the final vectors x' and p' are given by:

$$x' = A_0 x + B_0 (p - p_0) \tag{8}$$

and $$p' - p_0' = C_0 x + D_0 (p - p_0). \tag{9}$$

The linear system in Equation (7) transforms the initial position vector x and the difference between the initial ray slowness vector p and the initial central ray slowness vector $p_0$ from the anterior surface to into the final position vector x' and final slowness vector p' at the posterior surface. If the values of the elements of these matrices are known, then one can determine first-order position and slowness vectors on the posterior surface for any position and slowness vectors on the anterior surface, in the vicinity of a central ray.

Hamilton's principal equation for transmitted events gives the traveltime t of transmitted rays from any initial surface position x to any final surface position x' as a total differential $$dt(x, x') = p' \cdot dx' - p \cdot dx. \tag{10}$$

Hamilton's principal equation gives the traveltime difference between the central ray and another paraxial ray which is dislocated by an arbitrary small amount from the central ray on the initial (anterior) surface and on the final (posterior) surface. The partial derivatives, p and p', of the total differential, dt, in Equation (10) are defined in Equation (3) and expressed now by the first-order ray transformation in Equations (8) and (9), respectively, as $$-p = -p_0 + B_0^{-1} A_0 x - B_0^{-1} x' \tag{11}$$

and $$p' = p_0' + C_0 x - D_0 B_0^{-1} A_0 x + D_0 B_0^{-1} x'. \tag{12}$$

With the partial derivatives given in Equations (11) and (12), the traveltime function $t=t(x, x')$ for a transmitted ray in a seismic system is given as a second-order approximation by:

$$t = t_0 - p_0 \cdot x + p_0' \cdot x' + \frac{1}{2} x' \cdot D_0 B_0^{-1} x' + \frac{1}{2} x \cdot B_0^{-1} A_0 x - x \cdot B_0^{-1} x'. \tag{13}$$

where $t_0$ is the one-way traveltime for the central ray. Equation (13) gives the traveltimes of transmitted rays in anisotropic heterogeneous media from any point x on the anterior surface to any another point x' on the posterior surface. Equation (13) is known as Hamilton's point characteristic for transmitted events. Pre-stack time migration transforms the diffraction times of a trace onto the apex time at such surface position where the transmitted ray, with final position at the diffraction point and initial slowness vector p=0, intersects the anterior surface. This is the surface position of the image ray. Note that the image ray direction vector is generally not parallel to the slowness vector (see Equation (1)). For the derivation of the diffraction time function the central ray is taken as image ray now. The diffraction time from any source position $x_s$ to any receiver position $x_r$ in the vicinity of the image ray is obtained as the addition of two terms: 1) the traveltime of the transmitted ray from the source position $x_s$ at the surface to the diffraction point position x' (endpoint of the image ray) and 2) the traveltime of the transmitted ray from the receiver position $x_r$ to the diffraction point position x'. The traveltime of one transmitted ray, for example the one starting at the receiver position $x_r$, in a heterogeneous, anisotropic medium is obtained from Hamilton's point characteristic for transmitted events, Equation (10), as:

$$t_r = t_0^I - p_0 \cdot x_r + p_0' \cdot x' + \frac{1}{2} x' \cdot D_0 B_0^{-1} x' + \frac{1}{2} x_r \cdot B_0^{-1} A_0 x_r - x_r \cdot B_0^{-1} x' \tag{14}$$

The vector $p_0$ is now the surface projection of the image ray slowness vector and is, by definition, equal to zero. The traveltime $t_0^I$ is now the one-way traveltime of the image ray. The primed vectors are position and slowness vectors at the endpoint of the image ray, that is, at the diffraction point. All vectors are two-dimensional, as before, being projections of the three-dimensional vectors into either the surface plane or into the plane tangent to the reflection interface at the endpoint of the image ray. Considering a diffraction point at the endpoint of the image ray (acting now as the central ray), then x' is also zero and the diffraction traveltime $t_r$ from the receiver position $x_r$ on the surface plane becomes:

$$t_r^2 = (t_0^I)^2 + t_0^I x_r \cdot B_0^{-1} A_0 x_r \tag{15}$$

in the hyperbolic second-order approximation. The matrix combination $B_0^{-1} A^0$, is a 2×2 symmetric matrix (i.e., second order partial derivatives in receiver position coordinates). Using the predominant profile azimuth, $\alpha$, of the marine seismic streamer acquisition survey and the three independent components $U_{11}^I$, $U_{12}^I$, and $U_{22}^I$ of the matrix combination $B_0^{-1} A_0$, Equation (15) for the diffraction traveltime $t_r$ becomes:

$$t_r^2 = (t_0^I)^2 + t_0^I (U_{11}^I \cos^2 \alpha + 2 U_{12}^I \cos \alpha \sin \alpha + U_{22}^I \sin^2 \alpha) d_r^2, \tag{16}$$

where $d_r$ is the distance between the image ray and receiver position $x_r$. The unknown parameters $U_{11}^I$, $U_{12}^I$, and $U_{22}^I$ are also connected to the image ray. The hyperbolic approximation is made more visible after expressing the second term on the right side of Equation (16) by:

$$t_r^2 = (t_0^I)^2 + \frac{d_r^2}{V_{TM}(\alpha)^2}, \quad (17)$$

where an azimuthal time migration velocity $V_{TM}(\alpha)$ is defined by:

$$V_{TM}(\alpha)^{-2} = t_0^I(U_{11}^I \cos^2\alpha + 2U_{12}^I \cos\alpha \sin\alpha + U_{22}^I \sin^2\alpha). \quad (18)$$

Equations (17) and (18) relates the (azimuthal) time migration velocities to the three independent parameters $U_{11}^I$, $U_{12}^I$, and $U_{22}^I$, which provides a tool for extracting these parameters during seismic processing, by velocity analysis. The derived time migration function is valid for heterogeneous media with any type and strength of anisotropy. The complete diffraction time for time migration is obtained by adding to the receiver side diffraction times the corresponding source side diffraction times.

Figure 2:
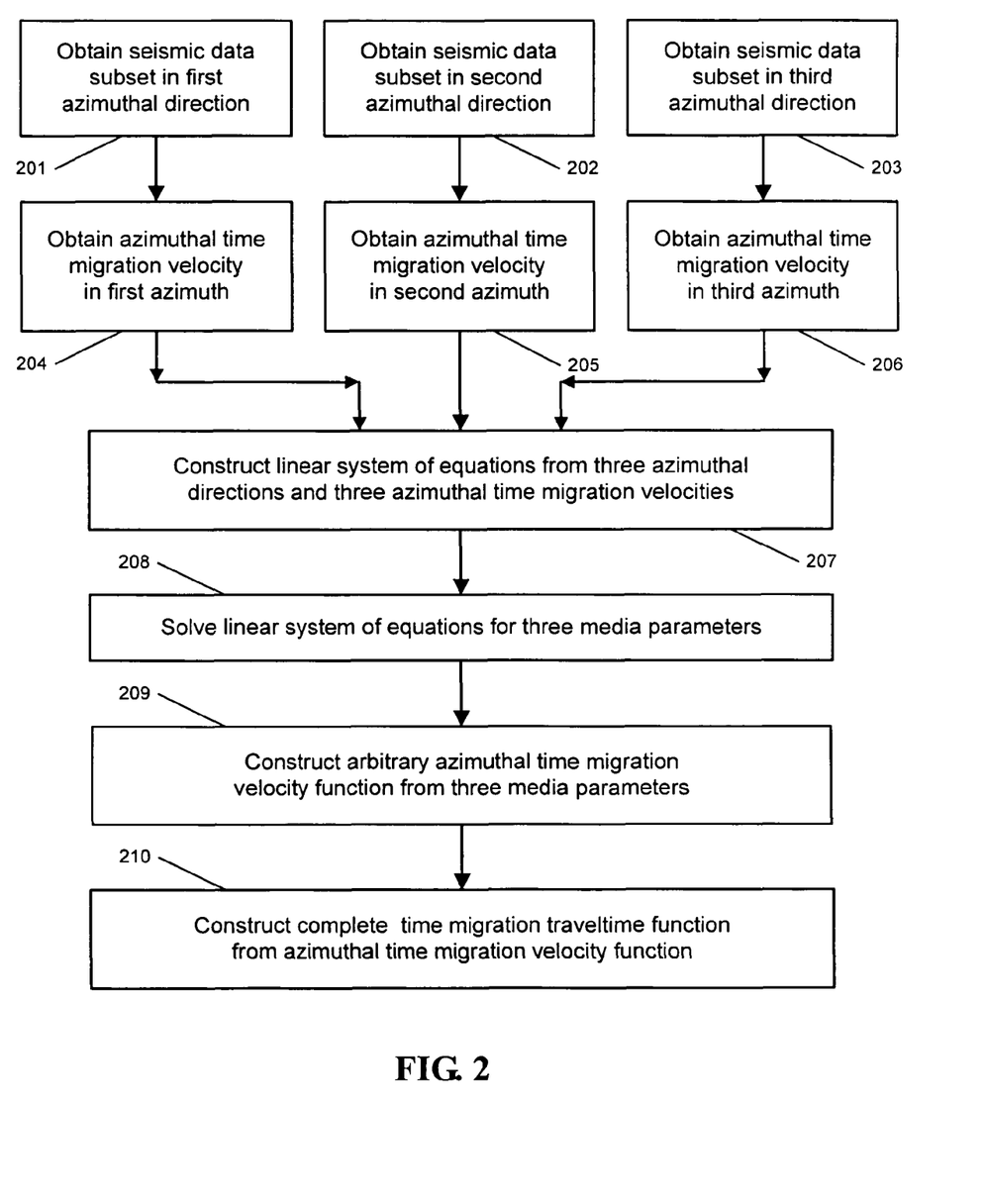
FIG. 2 is a flowchart illustrating the processing steps of an embodiment of the method of the invention for azimuthal velocity analysis and prestack time migration.

FIG. 2 is a flowchart illustrating the processing steps of an embodiment of the method of the invention for azimuthal velocity analysis and prestack time migration. Velocity analysis from one predominant azimuthal direction provides insufficient information to determine the three parametric time migration operator for general heterogeneous, anisotropic media. If seismic data from three azimuthal directions is available from multi-azimuth or wide azimuth acquisition, then the diffraction time function for a general anisotropic, heterogeneous medium can be determined either by semblance building in time migrated image gathers. The following flowchart illustrates the semblance stack analysis.

In steps 201, 202, and 203, three subsets of seismic data from three different azimuthal directions: $\alpha_1$, $\alpha_2$, and $\alpha_3$, are obtained from a seismic data set. The characteristic time parameters $U_{11}^I$, $U_{12}^I$, and $U_{22}^I$ will be obtained by semblance analysis of the time image gathers from the three azimuthal directions.

In steps 204, 205, and 206, three azimuthal time migration velocities, $V_{TM}(\alpha_i)$, are determined for i=1, 2, 3, from the three subsets of seismic data in each of the three azimuthal directions, $\alpha_i$ for i=1, 2, 3, obtained in steps 201, 202, and 203, respectively. The three azimuthal time migration velocities are determined by prestack time migration velocity analysis.

In step 207, the following linear system of equations is constructed from the three azimuthal directions selected in steps 201, 202, and 203 and the three corresponding azimuthal time migration velocities determined in step 204, 205, and 206, respectively:

$$t_0^I \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} U_{11}^I \\ U_{12}^I \\ U_{22}^I \end{bmatrix} = \begin{bmatrix} V_{TM}(\alpha_1)^{-2} \\ V_{TM}(\alpha_2)^{-2} \\ V_{TM}(\alpha_3)^{-2} \end{bmatrix}. \quad (19)$$

In step 208, Equation (19), the linear system of equations constructed in step 207 is solved for the three unknowns, the three characteristic time processing parameters $U_{11}^I$, $U_{12}^I$, and $U_{22}^I$.

In step 209, an azimuthal time migration velocity function for arbitrary azimuth $\alpha$ is constructed from the three characteristic time processing parameters $U_{11}^I$, $U_{12}^I$, and $U_{22}^I$ solved for in Equation (19) in step 208. This azimuthal time migration velocity $V_{TM}(\alpha)$ is given by:

$$V_{TM}(\alpha)^{-2} = t_0^I(U_{11}^I \cos^2\alpha + 2U_{12}^I \cos\alpha \sin\alpha + U_{22}^I \sin^2\alpha). \quad (20)$$

In step 210, the complete time migration traveltime function is determined utilizing the time migration velocity function constructed in step 209. The complete time migration traveltime $T_{TM}$ is given by:

$$T_{TM} = \sqrt{(t_0^I)^2 + \frac{d_r^2}{V_{TM}(\alpha)^2}} + \sqrt{(t_0^I)^2 + \frac{d_s^2}{V_{TM}(\alpha)^2}}, \quad (21)$$

where $d_s$ is the distance between the image ray and the source position $x_s$. This yields the 3D prestack time migration operator for a heterogeneous, anisotropic medium.

In another embodiment a normal ray is considered as the central ray. The normal ray has, by definition, the final slowness vector $p_0'=0$. Hamilton's point characteristic for a reflected ray in a seismic system is obtained by treating a reflected ray as the pairing of two down-pointing transmitted rays, yielding the following two-way traveltime function for a reflected ray:

$$T = T_0 - 2p_0 \cdot \frac{1}{2}(x_r + x_s) + \quad (22)$$

$$\frac{1}{2}(x_r + x_s) \cdot D_0^{-1} C_0 \frac{1}{2}(x_r + x_s) + \frac{1}{2}(x_r - x_s) \cdot B_0^{-1} A_0 \frac{1}{2}(x_r - x_s),$$

where $T_0$ is the two-way traveltime of a reflected ray at receiver and source position $x=x_r=x_s$. Equation (22) gives the reflection times in a seismic system for any source and receiver position, $x_s$ and $x_r$, at the surface, again in a second-order approximation. As above, the position vectors, $x_s$ and $x_r$, are two-component vectors in the xy plane. The symmetric matrix combinations $B_0^{-1}A_0$ and $D_0^{-1}C_0$ represent traveltime curvatures. The symmetry of these matrix combinations can be verified by building the second-order partial derivatives of the traveltime against the half offset coordinates $\frac{1}{2}(x_r+x_s)$ and midpoint coordinates $\frac{1}{2}(x_r-x_s)$ in Equation (22).

The reflection time function of a common-midpoint (CMP) gather with common midpoint vector at the origin of the co-ordinate system may be extracted by setting $\frac{1}{2}(x_r+x_s)=0$ in Equation (22). After building the square on both sides of Equation (22), the hyperbolic CMP two-way traveltime function, $T_{CMP}$, is obtained by dropping the terms of order higher than two:

$$T_{CMP}^2 = T_0^2 + 2T_0 \frac{1}{2}(x_r - x_s) \cdot B_0^{-1} A_0 \frac{1}{2}(x_r - x_s). \quad (23)$$

The three independent elements of the symmetric 2×2 matrix $B_0^{-1}A_0$ are denoted by $W_{11}$, $W_{12}$, and $W_{22}$, and the offset vector is represented by its magnitude, h, and azimuth, $\alpha$ (angle between the x axis and the offset vector). Equation (23) then becomes:

$$T_{CMP}^2 = T_0^2 + \frac{T_0}{2}(W_{11}\cos^2\alpha + 2W_{12}\cos\alpha\sin\alpha + W_{22}\sin^2\alpha)h^2. \quad (24)$$

This relation in Equation (24) is finally reduced to the familiar reflection hyperbola in an arbitrary CMP profile direction:

$$T_{CMP}^2 = T_0^2 + \frac{h^2}{V_{NMO}^2(\alpha)}, \quad (25)$$

where $V_{NMO}(\alpha)$ is the NMO stacking velocity defined as:

$$V_{NMO}^{-2}(\alpha) \equiv \frac{T_0}{2}(W_{11}\cos^2\alpha + 2W_{12}\cos\alpha\sin\alpha + W_{22}\sin^2\alpha). \quad (26)$$

Equations (25) and (26) show that: a) the hyperbolic CMP reflection traveltime function $T_{CMP}$ is valid for general anisotropic heterogeneous media (anisotropic seismic systems); b) an NMO velocity $V_{NMO}(\alpha_i)$ for one constant azimuth $\alpha_i$ is obtained by NMO stacking velocity analysis from the CMP profile with azimuth $\alpha_i$; and c) the complete NMO stacking velocity function (ellipse) is generally given by a combination of $W_{11}$, $W_{12}$, and $W_{22}$. These parameters are again extracted by at least three velocity analyses from three distinct CMP profiles in three azimuthal directions $\alpha_1$, $\alpha_2$, and $\alpha_3$, as:

$$\frac{T_0}{2}\begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} W_{11} \\ W_{12} \\ W_{22} \end{bmatrix} = \begin{bmatrix} V_{NMO}(\alpha_1)^{-2} \\ V_{NMO}(\alpha_2)^{-2} \\ V_{NMO}(\alpha_3)^{-2} \end{bmatrix}. \quad (27)$$

Equations (25) and (26) relate the three independent parameters $W_{11}$, $W_{12}$, and $W_{22}$ of the matrix combination $B_0^{-1} A_0$ to the commonly used imaging parameters in seismic processing, the NMO stacking velocities $V_{NMO}(\alpha)$.

The relation for azimuthal NMO velocity in Equations (25) and (26) appears to share a formal identity with the relation for azimuthal time migration velocity in Equations (17) and (18). However, the NMO velocities and time migration velocities are identical solely in one peculiar situation, if the normal rays and image rays are identical. In other words, whenever time migration is needed for imaging, these velocities are different and the NMO velocities can not be used for conventional time migration.

As a further extension of the multi-azimuth prestack time migration, the diffraction time function is determined around the normal ray (considered now as the central ray) from azimuthal NMO velocities, zero offset times, and zero offset slopes. From Hamilton's point characteristic for transmitted events in Equation (13), the traveltimes of transmitted rays may be extracted. For example, the traveltime from the receiver at $x_r$ to the diffraction point at the endpoint of the normal ray is:

$$t_r = t_0^N - p_0 \cdot x_r + \frac{1}{2} x_r \cdot B_0^{-1} A_0 x_r, \quad (28)$$

where $t_r$ is the one-way diffraction time and $t_0^N$ is the one-way traveltime along the normal ray. The initial slowness vector $p_0$ and $B_0^{-1} A_0$ are also related to the normal ray. The hyperbolic second-order approximation is obtained squaring both sides of Equation (28) and dropping terms of higher than second order, yielding:

$$t_r^2 = (t_0^N - p_0 \cdot x_r)^2 + t_0^N x_r \cdot B_0^{-1} A_0 x_r. \quad (29)$$

The three independent elements $W_{11}$, $W_{12}$, and $W_{22}$ of the symmetric 2×2 matrix $B_0^{-1} A_0$ are known from azimuthal NMO velocities analysis, as discussed above with regard to Equation (27). The initial slowness vector $p_0$ is related to the zero offset time function (given by removing the moveout term, the last term, in Equation (22)) and is obtained from slant stack in a zero offset cubes or simply extracted from the zero offset time surface gradients.

The complete prestack time migration traveltime function based on azimuthal NMO velocities is given by combining the receiver ray leg with the source ray leg, as:

$$T_{TM} = \sqrt{(t_0^N - p_0 \cdot x_r)^2 + t_0^N x_r \cdot B_0^{-1} A_0 x_r} + \sqrt{(t_0^N - p_0 \cdot x_s)^2 + t_0^N x_s \cdot B_0^{-1} A_0 x_s}. \quad (30)$$

Stacking the 3D data volume along the diffraction time function and placing the result at the initial position of such an image ray, which has a common final position with the normal (central) ray, at the two-way image time is by definition a prestack time migration. The image position $x_A$ is found by searching for the apex of the diffraction time function $t_r$ in Equation (29), obtained as:

$$x_A = t_0^N (p_0 p_0^T + t_0^N B_0^{-1} A_0)^{-1} p_0. \quad (31)$$

The two-way image time $T_A$ corresponding to the image position $x_A$ is consequently found by taking twice the diffraction time $t_r$ in Equation (29) and setting $x_r = x_A$:

$$T_A = 2 t_r(x_A). \quad (32)$$

Equations (30), (31), and (32) represent the diffraction times, apex position and apex time that allow for azimuthal prestack time migration based on azimuthal NMO velocities.

Thus, in the present invention, azimuthal velocity functions for 3D velocity analysis have been established for normal moveout and time migration. These functions show a relation between azimuthal time migration velocities and a 3D prestack time migration operator and thus build the foundation of a 3D azimuthal imaging (i.e. time migration) of a heterogeneous medium valid for any type and strength of anisotropy. Time migration events of common reflectors as obtained by applying standard time migration are generally different in different azimuth surveys. The multi-azimuth prestack time migration operators of the invention migrate common reflectors into common time images in heterogeneous, anisotropic media. In all of the above, the accuracy of the multi-azimuth prestack time migration operator is determined by second order traveltime approximation.

The differential form of the traveltimes in Hamilton's principal equation allows developing traveltime functions up to any order of approximation. The interfaces are locally described by second order polynomials in a second order traveltime approximation. In a third order of traveltime approximation (valid in a wider range around the central ray) the local approximation of interfaces is extended to third order polynomials. Increase in order has also consequences for characteristic traveltime parameters determination (e.g. azimuthal velocity analysis). All these parameters are constants within the range of validity of second order of traveltime approximation, only. For example, the characteristic time processing parameters $U_{11}$, $U_{12}$, and $U_{22}$ (the constants which define the velocity ellipse in the second order of approximation) become linear functions of source and receiver coordinates in the third order of approximation. The order of this dependency increases with increasing order of approximation. Thus, utilizing the second order of approximation has advantages. Firstly, the range of validity of the second order of approximation covers well the offset ranges of standard acquisition schemes. And secondly, the second order traveltime functions have an agreeable formal simplicity.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. A method for providing a seismic image of earth's subsurface, comprising:
applying prestack time migration to a seismic data set representative of earth's subsurface in anisotropic, heterogeneous media, the seismic data acquired by deploying a plurality of seismic sensors proximate an area of the earth's subsurface to be evaluated, the seismic sensors generating at least one of an electrical and optical signal in response to seismic energy, comprising:
performing multi-azimuth seismic data acquisition, comprising:
obtaining three data subsets in three selected azimuthal directions from the seismic data set;
performing azimuthal velocity analysis on the seismic data set to generate a velocity function representative of the seismic velocities in the earth's subsurface, comprising:
determining an azimuthal velocity for each of the three data subsets;
solving a linear system of equations in the three selected azimuthal directions and the three determined azimuthal velocities for three independent parameters; and
constructing an azimuthal time migration velocity function from the three solved independent parameters; and
constructing a time migration traveltime function from the constructed azimuthal time migration velocity function;
providing an image of the earth's subsurface using the time migration traveltime function.

2. The method of claim 1, wherein the linear system of equations comprises:

$$t_0^I \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} U_{11}^I \\ U_{12}^I \\ U_{22}^I \end{bmatrix} = \begin{bmatrix} V_{TM}(\alpha_1)^{-2} \\ V_{TM}(\alpha_2)^{-2} \\ V_{TM}(\alpha_3)^{-2} \end{bmatrix},$$

where $t_0^I$ is the one-way travel time of an image ray; $\alpha_1$, $\alpha_2$, and $\alpha_3$ are the three azimuthal directions; $U_{11}^I$, $U_{12}^I$, and $U_{22}^I$ are the three independent parameters; and time migration velocities $V_{TM}(\alpha_1)$, $V_{TM}(\alpha_2)$, and $V_{TM}(\alpha_3)$ are the three azimuthal velocities.

3. The method of claim 2, wherein the azimuthal time migration velocity function $V_{TM}(\alpha)$ for an arbitrary azimuth $\alpha$ is given by:

$V_{TM}(\alpha)^{-2} = t_0^I(U_{11}^I \cos^2\alpha + 2U_{12}^I \cos\alpha \sin\alpha + U_{22}^I \sin^2\alpha).$ 4. The method of claim 3, wherein the time migration travel time function $T_{TM}$ is given by:

$$T_{TM} = \sqrt{(t_0^I)^2 + \frac{d_r^2}{V_{TM}(\alpha)^2}} + \sqrt{(t_0^I)^2 + \frac{d_s^2}{V_{TM}(\alpha)^2}},$$

where $d_r$ is the distance between the image ray and a receiver position, and $d_s$ is the distance between the image ray and a source position.

5. The method of claim 1, wherein the linear system of equations comprises:

$$t_0^N \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} W_{11} \\ W_{12} \\ W_{22} \end{bmatrix} = \begin{bmatrix} V_{NMO}(\alpha_1)^{-2} \\ V_{NMO}(\alpha_2)^{-2} \\ V_{NMO}(\alpha_3)^{-2} \end{bmatrix},$$

where $t_0^N$ is the one-way traveltime of a normal ray; $\alpha_1$, $\alpha_2$, and $\alpha_3$ are the three azimuthal directions; $W_{11}$, $W_{12}$, and $W_{22}$ are the three independent parameters; and normal moveout velocities $V_{NMO}(\alpha_1)$, $V_{NMO}(\alpha_2)$, and $V_{NMO}(\alpha_3)$ are the three azimuthal velocities.

6. The method of claim 5, wherein the azimuthal normal moveout velocity function $V_{NMO}(\alpha)$ for an arbitrary azimuth $\alpha$ is given by:

$V_{NMO}(\alpha)^{-2} = t_0^N(W_{11} \cos^2\alpha + 2W_{12} \cos\alpha \sin\alpha + W_{22} \sin^2\alpha).$ 7. The method of claim 6, wherein the time migration traveltime function $T_{TM}$ is given by:

$T_{TM} = \sqrt{(t_0^N - p_0 \cdot x_r)^2 + t_0^N x_r \cdot B_0^{-1} A_0 x_r} + \sqrt{(t_0^N - p_0 \cdot x_s)^2 + t_0^N x_s \cdot B_0^{-1} A_0 x_s},$ where vector $p_0$ is a surface projection of a normal ray slowness vector, $x_r$ is a receiver position, $x_s$ is a source position, and $B_0^{-1} A_0$ is the matrix $$\begin{bmatrix} W_{11} & W_{12} \\ W_{12} & W_{22} \end{bmatrix}.$$

8. A method for providing an image of earth's subsurface from a seismic data set in anisotropic, heterogeneous media, comprising:
using a programmable computer to perform the following:
obtaining three data subsets in three selected azimuthal directions from the seismic data set;
determining an azimuthal velocity for each of the three data subsets;
solving a linear system of equations in the three selected azimuthal directions and the three determined azimuthal velocities for three independent parameters;
constructing an azimuthal time migration velocity function from the three solved independent parameters;
constructing a time migration traveltime function from the constructed azimuthal time migration velocity function; and
providing an image of the earth's subsurface using the time migration traveltime function.

9. The method of claim 8, wherein the linear system of equations comprises:

$$t_0^I \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} U_{11}^I \\ U_{12}^I \\ U_{22}^I \end{bmatrix} = \begin{bmatrix} V_{TM}(\alpha_1)^{-2} \\ V_{TM}(\alpha_2)^{-2} \\ V_{TM}(\alpha_3)^{-2} \end{bmatrix},$$

where $t_0^I$ is the one-way travel time of an image ray; $\alpha_1$, $\alpha_2$, and $\alpha_3$ are the three azimuthal directions; $U_{11}^I$, $U_{12}^I$, and $U_{22}^I$ are the three independent parameters; and time migration velocities $V_{TM}(\alpha_1)$, $V_{TM}(\alpha_2)$, and $V_{TM}(\alpha_3)$ are the three azimuthal velocities.

10. The method of claim 9, wherein the azimuthal time migration velocity function $V_{TM}(\alpha)$ for an arbitrary azimuth $\alpha$ is given by:

$$V_{TM}(\alpha)^{-2} = t_0^I(U_{11}^I \cos^2\alpha + 2U_{12}^I \cos\alpha \sin\alpha + U_{22}^I \sin^2\alpha).$$

11. The method of claim 10, wherein the time migration travel time function $T_{TM}$ is given by:

$$T_{TM} = \sqrt{(t_0^I)^2 + \frac{d_r^2}{V_{TM}(\alpha)^2}} + \sqrt{(t_0^I)^2 + \frac{d_s^2}{V_{TM}(\alpha)^2}},$$

where $d_r$ is the distance between the image ray and a receiver position, and $d_s$ is the distance between the image ray and a source position.

12. The method of claim 8, wherein the linear system of equations comprises:

$$t_0^N \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} W_{11} \\ W_{12} \\ W_{22} \end{bmatrix} = \begin{bmatrix} V_{NMO}(\alpha_1)^{-2} \\ V_{NMO}(\alpha_2)^{-2} \\ V_{NMO}(\alpha_3)^{-2} \end{bmatrix},$$

where $t_0^N$ is the one-way traveltime of a normal ray; $\alpha_1$, $\alpha_2$, and $\alpha_3$ are the three azimuthal directions; $W_{11}$, $W_{12}$, and $W_{22}$ are the three independent parameters; and normal moveout velocities $V_{NMO}(\alpha_1)$, $V_{NMO}(\alpha_2)$, and $V_{NMO}(\alpha_3)$ are the three azimuthal velocities.

13. The method of claim 12, wherein the azimuthal normal moveout velocity function $V_{NMO}(\alpha)$ for an arbitrary azimuth $\alpha$ is given by:

$$V_{NMO}(\alpha)^{-2} = t_0^N(W_{11}\cos^2\alpha + 2W_{12}\cos\alpha\sin\alpha + W_{22}\sin^2\alpha).$$

14. The method of claim 13, wherein the time migration traveltime function $T_{TM}$ is given by:

$$T_{TM} = \sqrt{(t_0^N - p_0 \cdot x_r)^2 + t_0^N x_r \cdot B_0^{-1} A_0 x_r} + \sqrt{(t_0^N - p_0 \cdot x_s)^2 + t_0^N x_s \cdot B_0^{-1} A_0 x_s},$$

where vector $p_0$ is a surface projection of a normal ray slowness vector, $x_r$ is a receiver position, $x_s$ is a source position, and $B_0^{-1} A_0$ is the matrix $$\begin{bmatrix} W_{11} & W_{12} \\ W_{12} & W_{22} \end{bmatrix}.$$

15. A computer readable medium with a computer program stored thereon, the program having logic operable to cause a programmable computer to perform steps to provide an image of earth's subsurface from a seismic data set in anisotropic, heterogeneous media, comprising:

obtaining three data subsets in three selected azimuthal directions from the seismic data set;

determining an azimuthal velocity for each of the three data subsets;

solving a linear system of equations in the three selected azimuthal directions and the three determined azimuthal velocities for three independent parameters;

constructing an azimuthal time migration velocity function from the three solved independent parameters;

constructing a time migration traveltime function from the constructed azimuthal time migration velocity function; and providing an image of the earth's subsurface using the time migration traveltime function.

16. The medium of claim 15, wherein the linear system of equations comprises:

$$t_0^I \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} U_{11}^I \\ U_{12}^I \\ U_{22}^I \end{bmatrix} = \begin{bmatrix} V_{TM}(\alpha_1)^{-2} \\ V_{TM}(\alpha_2)^{-2} \\ V_{TM}(\alpha_3)^{-2} \end{bmatrix},$$

where $t_0^I$ is the one-way travel time of an image ray; $\alpha_1$, $\alpha_2$, and $\alpha_3$ are the three azimuthal directions; $U_{11}^I$, $U_{12}^I$, and $U_{22}^I$ are the three independent parameters; and time migration velocities $V_{TM}(\alpha_1)$, $V_{TM}(\alpha_2)$, and $V_{TM}(\alpha_3)$ are the three azimuthal velocities.

17. The medium of claim 16, wherein the azimuthal time migration velocity function $V_{TM}(\alpha)$ for an arbitrary azimuth $\alpha$ is given by:

$$V_{TM}(\alpha)^{-2} = t_0^I(U_{11}^I \cos^2\alpha + 2U_{12}^I \cos\alpha \sin\alpha + U_{22}^I \sin^2\alpha).$$

18. The medium of claim 17, wherein the time migration travel time function $T_{TM}$ is given by:

$$T_{TM} = \sqrt{(t_0^I)^2 + \frac{d_r^2}{V_{TM}(\alpha)^2}} + \sqrt{(t_0^I)^2 + \frac{d_s^2}{V_{TM}(\alpha)^2}},$$

where $d_r$ is the distance between the image ray and a receiver position, and $d_s$ is the distance between the image ray and a source position.

19. The medium of claim 15, wherein the linear system of equations comprises:

$$t_0^N \begin{bmatrix} \cos^2\alpha_1 & 2\cos\alpha_1\sin\alpha_1 & \sin^2\alpha_1 \\ \cos^2\alpha_2 & 2\cos\alpha_2\sin\alpha_2 & \sin^2\alpha_2 \\ \cos^2\alpha_3 & 2\cos\alpha_3\sin\alpha_3 & \sin^2\alpha_3 \end{bmatrix} \cdot \begin{bmatrix} W_{11} \\ W_{12} \\ W_{22} \end{bmatrix} = \begin{bmatrix} V_{NMO}(\alpha_1)^{-2} \\ V_{NMO}(\alpha_2)^{-2} \\ V_{NMO}(\alpha_3)^{-2} \end{bmatrix},$$

where $t_0^N$ is the one-way traveltime of a normal ray; $\alpha_1$, $\alpha_2$, and $\alpha_3$ are the three azimuthal directions; $W_{11}$, $W_{12}$, and $W_{22}$ are the three independent parameters; and normal moveout velocities $V_{NMO}(\alpha_1)$, $V_{NMO}(\alpha_2)$, and $V_{NMO}(\alpha_3)$ are the three azimuthal velocities.

20. The medium of claim 19, wherein the azimuthal normal moveout velocity function $V_{NMO}(\alpha)$ for an arbitrary azimuth $\alpha$ is given by:

$$V_{NMO}(\alpha)^{-2} = t_0^N (W_{11} \cos^2 \alpha + 2 W_{12} \cos \alpha \sin \alpha + W_{22} \sin^2 \alpha).$$

21. The medium of claim 20, wherein the time migration traveltime function $T_{TM}$ is given by:

$$T_{TM} = \sqrt{(t_0^N - p_0 \cdot x_r)^2 + t_0^N x_r \cdot B_0^{-1} A_0 x_r} + \sqrt{(t_0^N - p_0 \cdot x_s)^2 + t_0^N x_s \cdot B_0^{-1} A_0 x_s},$$

where vector $p_0$ is a surface projection of a normal ray slowness vector, $x_r$ is a receiver position, $x_s$ is a source position, and $B_0^{-1} A_0$ is the matrix $$\begin{bmatrix} W_{11} & W_{12} \\ W_{12} & W_{22} \end{bmatrix}.$$

* * * * *